United States Patent [19]
Hickmann et al.

[11] Patent Number: 4,848,297
[45] Date of Patent: Jul. 18, 1989

[54] ARRANGEMENT FOR AN AUTOMOTIVE VEHICLE PARTICULARLY A LINKAGE SYSTEM

[75] Inventors: Gerd Hickmann, Kirchen-Wehbach; Manfred Pfalzgraf, Frankfurt am Main, both of Fed. Rep. of Germany

[73] Assignee: VDO Adolf Schindling AG, Frankfurt am Main, Fed. Rep. of Germany

[21] Appl. No.: 128,229

[22] Filed: Dec. 3, 1987

[30] Foreign Application Priority Data

Dec. 3, 1986 [DE] Fed. Rep. of Germany ....... 3641244

[51] Int. Cl.[4] ...................... B60K 26/04; F02D 11/10
[52] U.S. Cl. ..................................... 123/342; 123/361; 123/399
[58] Field of Search ............... 123/340, 342, 352, 360, 123/361, 399

[56] References Cited

U.S. PATENT DOCUMENTS 4,224,907 9/1980 Lefeuvre et al. ............... 123/360 X
4,580,535 4/1986 Danno et al. .................. 123/361 X Primary Examiner—Tony M. Argenbright
Attorney, Agent, or Firm—Martin A. Farber

[57] ABSTRACT

In an arrangement for an automotive vehicle for intervention into the connection between an operating member and a control member which determines the power of the internal combustion engine of the automotive vehicle, the operating member being connected with a first driver and the control member with a second driver, and between the first and second drivers there acts a coupling spring the force of which acts against a first stop being present between the first and second drivers. A third driver is connected to a setting member. The third driver is operatively connected via a second stop with the second driver, a movement of the setting member in the direction towards reducing the power acting against the second stop.

10 Claims, 1 Drawing Sheet

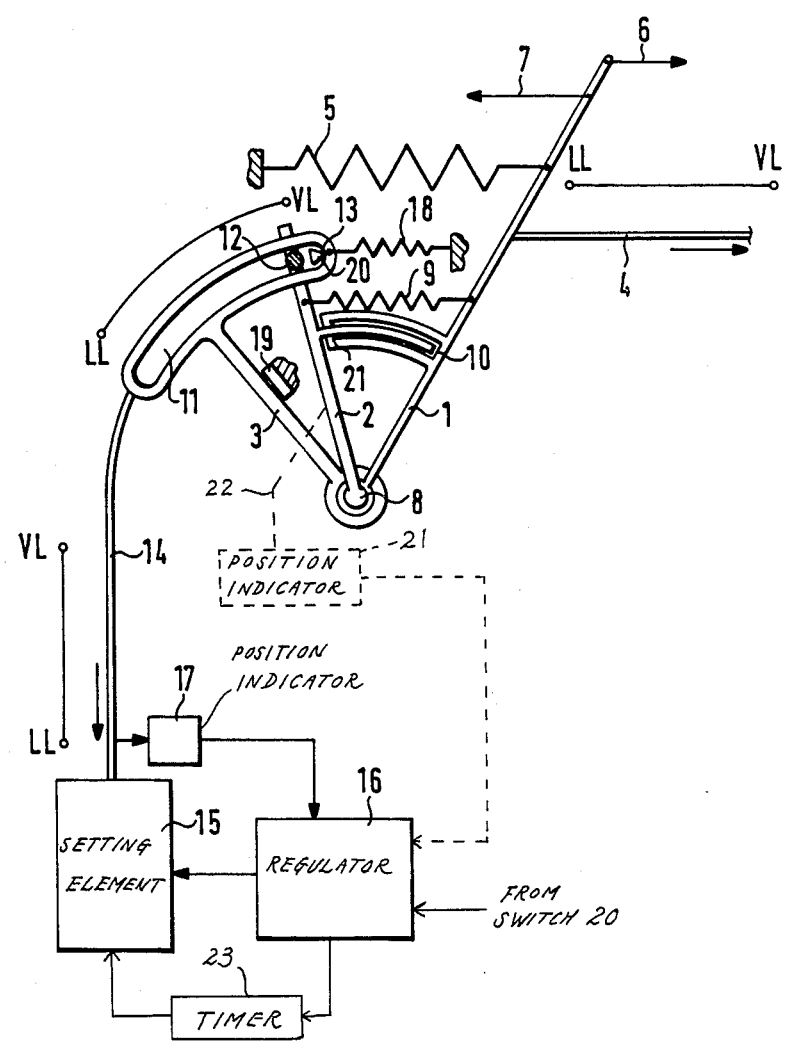

ARRANGEMENT FOR AN AUTOMOTIVE VEHICLE PARTICULARLY A LINKAGE SYSTEM

FIELD AND BACKGROUND OF THE INVENTION

The invention relates to an arrangement for an automotive vehicle for intervention in the connection between an operating member and a control member which determines the output of the internal combustion engine of the automotive vehicle, the operating member being connected to a first driver and the control member to a second driver, a coupling spring being active between the first and the second drivers, the force of said coupling spring acting against a first stop which is provided between the first and second drivers.

For various adjustments of internal combustion engines intervention in the connection between the operating member, for instance the gas pedal, and the control member, for instance the throttle valve or setting lever of the injection pump, is necessary. The regulating devices can be known devices for the avoidance of slippage or speed limiting governors. The intervention must always take place in such a manner that the adjustment permits only a reduction of the output pre-established by the driver.

In known arrangements for intervention in the connection between the operating member and the control member of an internal combustion engine, hydraulic setting members are provided. However, particularly in passenger cars, they represent a considerable additional expense. In another known arrangement a lever, the fulcrum of which is shifted upon the entering into action of the speed control, is interposed in the rod system between the gas pedal and the throttle valve of a commercial vehicle. In this case, however, there is present an action between the setting member and the control member which is dependent on the position of the gas pedal. What is desired, however, is an unequivocal association of the setting member with the control member when the intervention takes place, i.e. when the prior control is not affected by the gas pedal.

In order to avoid these disadvantages it has already been proposed for an arrangement of the aforementioned type that the operating member be connected to a first lever and the control member to a second lever, that a spring whose force acts in the direction of maintaining the pulling force is arranged between the levers and that the second lever is connected to the setting member via a unilaterally acting coupling. In this arrangement the spring is so dimensioned that its force is always greater for all positions entering into consideration than the force of the return spring of the control member. In the specific case this can lead to undesirably high spring forces.

SUMMARY OF THE INVENTION

It is an object of the present invention further to improve an arrangement of the aforementioned type.

According to the invention, a third driver (3) is connected to a setting member (15) and this third driver (3) is operatively connected via a second stop (13) to the second driver (2), a movement of the setting member (15) in the direction of a reduction of the output (down regulating) acting against the second stop (13).

The arrangement of the invention has the advantage that the return spring for the operating member acts directly on the operating member and thus does not act on the throttle valve shaft itself or on the drivers. An intervention effected by the setting member doesnot, for all practical purposes, make itself noticeable on the restoring force of the operating member or gas pedal. Furthermore, a rigid connection is possible between the third lever and the setting member (in contradistinction) to a movable coupling).

A further development of the invention resides in the fact that the drivers are formed by coaxially mounted levers (1-3). The second lever (2) can preferably be mounted fixed for rotation on a throttle valve shaft (8).

These further developments make possible a compact construction of the arrangement of the invention, and particularly a direct connection between the throttle valve socket and the arrangement of the invention.

Another further development of the invention consists therein that the first driver (1) is connected to the operating member via a cord (4) and is provided with a return spring (5).

The setting member can be connected directly to the third driver. However, in accordance with another embodiment, the third driver (3) can also be connected to the setting member (15) via an additional cord (14) and be provided with another return spring (18).

Since upon the controlling of the output of the internal combustion engine by means of the operating member, no fixed association of the positions of the second and third drivers with respect to each other is present as long as no intervention by the setting member takes place, no information with regard to the position of the throttle valve is present in the regulator itself. This information is, however, required for an intervention engagement which is as optimal as possible. Therefore, in accordance with another development, a switch (20) is provided which is activated upon the entering into action of the second stop (13).

The signal produced by the actuation of the switch is fed to the regulator, which evaluates the value given off at this time by the position indicator of the setting member as position of the throttle valve.

Instead of the switch, the second driver (2) can also, in accordance with another embodiment, be connected to a second position indicator.

In still another embodiment, the relative movement between the first and second drivers (1, 2) is limited to a path or angle which is smaller than that necessary for actuating the control member between full-load and idle-load positions. In this way, if necessary, a force which is greater than the return force of the coupling spring can be exerted on the throttle valve.

Finally, another development comprises a device which effects a disconnecting of the setting member (15) if the first stop (13) is not acted on by load for a predetermined period of time. In this way, a return of the setting member into its position of rest is made possible if the gas pedal is moved back during an intervention.

BRIEF DESCRIPTION OF THE DRAWING

With the above and other objects in view the present invention will be described in connection with the following description of a preferred embodiment of the invention according to the accompanying drawing in which the sole FIGURE is a schematic view of the system of the invention.

DETAILED DESCRIPTION OF THE PREFERRED EMBODIMENT

In the embodiment shown in the drawing, the drivers are developed as coaxially mounted levers 1, 2, 3. The pull cord 4 of the gas pedal (not shown) and a return spring 5 act on the lever 1. As needed, the lever 1 can furthermore be controlled by a stop for regulating the speed of the vehicle and by an automatic transmission, as is diagrammatically indicated by the arrows 6 and 7.

The lever 2 is mounted, fixed for rotation, on a rotatable throttle valve shaft 8, and is pressed by a coupling spring 9 against the stop 10 so that, without the action of further forces on the lever 2 or on the throttle valve (not shown), the levers 1 and 2 form a predetermined angle and the throttle valve thus follows along in the movements of the gas pedal.

The lever 3 has a cutout 11 having the shape of a portion of an annulus into which a pin 12 of the lever 2 engages. The end 13 of the cutout 11 and the pin 12 form a stop between the lever 2 and the lever 3.

Via a pull cord 14 there is connected to the lever 3 a setting element 15 which is controlled by a regulator 16 and has a position indicator 17 which reports the instantaneous position of the setting element to the regulator 16. The lever 3 is furthermore connected to a spring 18 which, when the setting element is without current, pulls the lever 3 into a position of rest in which it strikes against the stationary stop 19.

The corresponding adjustment ranges of the pull cord 4, the lever 2 and the setting element 15 are each indicated by a path at the ends of which LL stand for idle travel and VL for full load. The drawing shows the arrangement of the invention in a condition in which no intervention takes place and the gas pedal and/or pull cord 4 and the lever 2 and thus the throttle valve are almost in the full load position. The setting element is also in the full load position, which, however, means that no intervention takes place.

If the operator removes his foot from the gas pedal then the lever 2 moves within the cutout 11 of the lever 3 in the direction towards the idle position. As long as the setting member is in the full load position the driver can unrestrictedly move the throttle valve via the gas pedal.

If, however, a signal for intervention is given to the setting element 15 by the regulator 16 then the lever 3 turns in counterclockwise direction. The right end 13 of the cutout 11 comes against the pin 12, whereupon a switch 20 reports to the regulator that the setting element has reached the present position of the throttle valve. From here on, the actual intervention takes place, the extent of which is determined in accordance with the existing requirements by the regulator. With the stretching of the spring 9, the connection produced by the stop 10 between the lever 1 and the lever 2 is done away with. Since the restoring force of the spring 5 is substantially greater that the restoring force of the spring 9, the operator feels practically no change in the return force of the gas pedal.

In the event that the restoring force of the spring 9 should ever be insufficient to bring the throttle valve out of its idle position, the play between the levers 1 and 2 is limited by another stop 21. In this way, the entire force coming from the gas pedal via the pull cord 4 acts on the throttle valve.

If desired, an optional position indicator 21 (indicated in phantom) may be connected to the lever 2 for reporting to the regulator 16 a position of the lever 2, the indicator 21 being employed instead of the switch 20. Mechanical connection between the lever 2 and the regulator 21 is indicated by dashed line 22. Also, if desired, a timer 23 coupled between the regulator 16 and setting element 15 may be employed to accomplish a disconnecting of the setting element 15 if the second stop 13 is not acted on by a load for a predetermined period of time. In this way, a return of the setting element into its position of rest is made possible if the gas pedal is moved back during an intervention. Also, a direct connection of the lever 3 to the setting element 15 can be accomplished by replacing the cord 14 with a rod in which case the indentification numeral 14 is understood to identify such rod in the drawing.

While we have disclosed embodiments of the invention, it is to be understood that there are provided by way of illustration and not in a limiting sense.

We claim:

1. In a system for an automotive vehicle for intervention in a connection between an operating element and a control element which determines the output of an internal combustion engine of the automotive vehicle, the operating element being connected to a first driver and the control element being connected to a second driver, there being a coupling spring active between the first and the second drivers, there being a first stop provided between the first and the second drivers to resist a force of said coupling spring, the improvement comprising a third driver, a setting element, and a second stop; and wherein the third driver is connected to said setting element, and said third driver is operatively connected via said second stop to the second driver, a movement of the setting element in the direction of a reduction of an output of the engine being directed against the second stop; and each of the drivers comprises a coaxially mounted lever.

2. A system according to claim 1, wherein
   the second lever is mounted fixedly to a rotatable throttle valve shaft of the engine.

3. A system according to claim 1, wherein
   the first driver is connected to the operating element via a cord, the system including a return spring connected to the first driver.

4. A system according to claim 3, further comprising an additional cord and a second return spring; and wherein
   the third driver is connected to the setting element by said additional cord, and is connected further to said second return spring.

5. A system according to claim 2, wherein
   a relative movement between the first and the second drivers is limited to a path which is smaller than that necessary for actuating the control element between full-load and idle-load positions.

6. In a system for an automotive vehicle for intervention in a connection between an operating element and a control element which determines the output of an internal combustion engine of the automotive vehicle, the operating element being connected to a first driver and the control element being connected to a second driver, there being a coupling spring active between the first and the second drivers, there being a first stop provided between the first and the second drivers to resist a force of said coupling spring, the improvement comprising a third driver, a setting element, and a second stop; and wherein the third driver is connected to said setting element, and said third driver is operatively connected via said second stop to the second driver, a movement of the setting element in the direction of a reduction of an output of the engine being directed against the second stop; and wherein the system further comprises a position indicator and a regulator associated with the setting element, the position indicator providing the regulator with the actual value of the setting element for improved regulation; and a switch which is activated by a force of said third driver against said second driver at said second stop.

7. In a system for an automotive vehicle for intervention in a connection between an operating element and a control element which determines the output of an internal combustion engine of the automotive vehicle, the operating element being connected to a first driver and the control element being connected to a second driver, there being a coupling spring active between the first and the second drivers, there being a first stop provided between the first and the second drivers to resist a force of said coupling spring, the improvement comprising a third driver, a setting element, and a second stop; and wherein the third driver is connected to said setting element, and said third driver is operatively connected via said second stop to the second driver, a movement of the setting element in the direction of a reduction of an output of the engine being directed against the second stop; and wherein the system further comprises a position indicator and a regulator associated with the setting element, the position indicator providing the regulator with the actual value of the setting element for improved regulation; and a second position indicator connected to the second driver.

8. In a system for an automotive vehicle for intervention in a connection between an operating element and a control element which determines the output of an internal combustion engine of the automotive vehicle, the operating element being connected to a first driver and the control element being connected to a second driver, there being a coupling spring active between the first and the second drivers, there being a first stop provided between the first and the second drivers to resist a force of said coupling spring, the improvement comprising a third driver, a setting element, and a second stop; and wherein the third driver is connected to said setting element, and said third driver is operatively connected via said second stop to the second driver, a movement of the setting element in the direction of a reduction of an output of the engine being directed against the second stop; and wherein the system further comprises timing means which effects a disconnecting of the setting element in the absence of a loading upon the second stop for a predetermined period of time.

9. A system according to claim 8, further comprising a position indicator and a regulator associated with the setting element, the position indicator providing the regulator with the actual value of the setting element for improved regulation.

10. A system according to claim 8, wherein the setting element is connected directly to the third driver.

* * * * *